United States Patent
Tian et al.

(10) Patent No.: US 9,485,240 B2
(45) Date of Patent: Nov. 1, 2016

(54) MULTI-ACCOUNT LOGIN METHOD AND APPARATUS

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventors: Liang Tian, Beijing (CN); Tianping Wang, Beijing (CN); Peng Xiong, Beijing (CN); Huan Ren, Beijing (CN)

(73) Assignees: Beijing Qihoo Technology Company Limited, Beijing (CN); Qizhi Software (Beijing) Company Limited, Beijing (CN)

( * ) Notice: Subject to any disclaimer, the term of this patent is extended or adjusted under 35 U.S.C. 154(b) by 0 days.

(21) Appl. No.: 14/377,491

(22) PCT Filed: Feb. 6, 2013

(86) PCT No.: PCT/CN2013/071427
§ 371 (c)(1),
(2) Date: Aug. 7, 2014

(87) PCT Pub. No.: WO2013/117157
PCT Pub. Date: Aug. 15, 2013

(65) Prior Publication Data
US 2015/0012987 A1    Jan. 8, 2015

(30) Foreign Application Priority Data
Feb. 10, 2012 (CN) .......................... 2012 1 0030381

(51) Int. Cl.
*H04L 29/06* (2006.01)
*H04L 29/08* (2006.01)

(52) U.S. Cl.
CPC ........... *H04L 63/08* (2013.01); *H04L 63/0815* (2013.01); *H04L 67/02* (2013.01)

(58) Field of Classification Search
CPC ... H04L 63/08; H04L 63/0815; H04L 67/00; H04L 67/02; G06F 17/2247; G06F 17/30899
See application file for complete search history.

(56) References Cited

U.S. PATENT DOCUMENTS

| 6,115,040 A | * | 9/2000 | Bladow | ............... G06F 11/0709 |
| | | | | 707/E17.107 |
| 7,047,426 B1 | * | 5/2006 | Andrews | ................. G06F 21/88 |
| | | | | 707/E17.032 |

(Continued)

FOREIGN PATENT DOCUMENTS

| CN | 100355243 A | 6/2005 |
| CN | 101251858 A | 8/2008 |
| CN | 101984778 A | 3/2011 |
| CN | 102594813 A | 7/2012 |

OTHER PUBLICATIONS

Damien "How to login to multiple accounts on the same website siimultaneously", May 12, 2009, 3pages, retrieved from: http://www.maketecheasier.com.*

(Continued)

*Primary Examiner* — Catherine Thiaw
(74) *Attorney, Agent, or Firm* — Baker & Hostetler LLP

(57) ABSTRACT

The present invention discloses a multi-account login method and apparatus. Herein, the multi-account login method comprises: opening a temporary webpage window in a browser according to a multi-account login instruction; creating a Cookie for the temporary webpage window, wherein the Cookie is independent of a global Cookie of the browser; and performing multi-account login by using the temporary webpage window. By means of this application, it is convenient for a multi-account user to use a browser, thereby improving the use experience of the multi-account user in using the browser.

20 Claims, 9 Drawing Sheets

(56) References Cited

U.S. PATENT DOCUMENTS

| | | | |
|---|---|---|---|
| 7,296,076 B1* | 11/2007 | Portolani | H04L 67/1027 709/217 |
| 8,819,560 B2* | 8/2014 | Ortwein | G06F 9/542 715/207 |
| 8,856,869 B1* | 10/2014 | Brinskelle | H04L 63/08 726/12 |
| 8,949,406 B2* | 2/2015 | Wenig | G06F 9/54 709/203 |
| 2002/0010780 A1* | 1/2002 | Wong | G06F 17/30902 709/226 |
| 2004/0133563 A1* | 7/2004 | Harvey | G06F 17/30899 |
| 2004/0233052 A1* | 11/2004 | Uchigaki | G01C 21/36 340/525 |
| 2005/0125379 A1 | 6/2005 | Choi et al. | |
| 2006/0150245 A1* | 7/2006 | Cheng | H04L 12/1813 726/12 |
| 2010/0146301 A1* | 6/2010 | Shevchenko | H04L 63/0407 713/193 |
| 2013/0339842 A1* | 12/2013 | Zhang | G06F 17/2247 715/234 |
| 2014/0108667 A1* | 4/2014 | Reddy | G06F 17/30873 709/228 |

OTHER PUBLICATIONS

International Application No. PCT/CN2013/071427; International Search Report; dated May 9, 2013; 7 pages.

"Simple Realization of Multiple Sock Puppets (Multiple Account Logics) in One Browser of IE 8"; http//www.sina.com.on; Feb. 23, 2010; 4 pages; *English Translation*.

* cited by examiner

MULTI-ACCOUNT LOGIN METHOD AND APPARATUS

CROSS-REFERENCE TO RELATED APPLICATIONS

This application is the National Stage of International Application No. PCT/CN2013/071427, filed Feb. 6, 2013, which claims the benefits of Chinese Patent Application No. 201210030381.9, filed Feb. 10, 2012, the disclosures of which are incorporated herein by reference in their entireties.

TECHNICAL FIELD

The present invention relates to network technology field, and more particularly to a multi-account login method and apparatus.

BACKGROUND

Currently, as the applications of Internet technology become more and more wide, a lot of daily work and entertainment of people are performed on a network by a browser. Usually, the network uses HTTP (HyperText Transfer Protocol) protocol to transmit data, and then exhibit data to a user by the browser in the form of a Web page so as to be browsed by the user. However, the HTTP protocol is stateless, that is, a server does not know what the user did at a previous visit, which seriously obstructs the realization of interactive Web application programs.

For example, in a typical online shopping scenario, assuming that the user browses a few pages and buy a box of biscuits and two bottles of beverages, at the time of the checkout, because the HTTP is stateless, the server will know nothing about what the user has bought without additional means. Herein, Cookie (also known as a small text file or a cookie) is one of the additional means that is used to bypass the stateless of the HTTP. Cookies are information temporarily stored in a computer by the server, so that the server may identify the computer. When the website is browsed, a Web server may first send and store data to a computer of a client, and Cookies may help the user of the client record a typed text or some of options on a website. When the user visits the same website again, the Web server may first check the presence of Cookies data left last time. If present, the Web server may judge the user based on the contents of Cookie and send specific Web contents. In the above example, the server can set or read information contained in the Cookies, so as to maintain the state of the user in a session with the server. For example, in the above shopping scenario, when the user buys the first product, the server may send the user the page together along with a piece of Cookie where information about the product is recorded. When the user visits another page, the browser may send the Cookie to the server. The server may know what the user selected before. If the user continues to choose and buy the beverages, the server may add new product information to the original piece of Cookie. At the checkout, the server may read the sent Cookie accordingly.

Another typical application of the Cookie is the case that, at the time of logining a website, the user may be often requested by the website to enter a user name and a password, and the user can choose "Auto Login Next Time". If the "Auto Login Next time" is chosen, when the same site is visited next time, the user may login without entering the user name and the password. This is because the server has sent the Cookie containing the login credentials (a certain encryption form of the user name and the password) to the user's hard disk. At next login, (if the Cookie has not expired) the browser may send the Cookie to the server to verify the credentials, so that the user may login without entering the user name and the password.

However, as for the current browsers, only one global Cookie for a same webpage (website) can be saved in a browser. At the time of logining an account, the information of the account and password is transmitted via the Cookie, but this manner does not support a function of multiple-account open such that multiple accounts cannot be loginned simultaneously. If the Cookie information of different accounts is all saved in the global Cookie, the information of different accounts may bring the confusion and mutual influence, and a multi-account login for a user also cannot be successfully realized. Therefore, the user account login means of the current browser is not convenient for a multi-account user to use a browser, thereby disadvantageously affecting the use experience of the multiple-account user when using the browser.

SUMMARY OF THE INVENTION

In view of above problems, the present invention is proposed to provide a multi-account login method and apparatus to overcome the above problems or at least partially solve or relieve the above problems.

According to one aspect of the present invention, there is provided a multi-account login method, including: opening a temporary webpage window in a browser according to a multi-account login instruction; creating a Cookie for the temporary webpage window, wherein the Cookie is independent of a global Cookie of the browser; and performing multi-account login by using the temporary webpage window.

According to another aspect of the present invention, there is provided a multi-account login apparatus, including: an opening module, configured to open a temporary webpage window in a browser according to a multi-account login instruction; a creation module, configured to create a Cookie for the temporary webpage window, wherein the Cookie is independent of a global Cookie of the browser; and a login module, configured to perform multi-account login by using the temporary webpage window.

According to still another aspect of the present invention, there is provided a computer program, comprising computer readable codes, wherein when the computer readable codes are operated on a server, the server executes the above method.

According to further another aspect of the present invention, there is provided a computer readable medium, in which the above computer program is stored.

Advantageous effects of the invention are as follows:

In the present application, the temporary webpage window with independent Cookie may be used to realize the multi-account login for the multi-account user simultaneously having multiple accounts. The form and content of the temporary webpage window may be the same as those of conventional webpage window, except that the Cookie of the temporary webpage window is independent of the global Cookie of the browser.

The multi-account user may realize the multi-account login of multiple accounts according to the Cookie of the temporary webpage window and the global Cookie of the browser. Further, if a number of temporary webpage windows are used to perform the multi-account login, the Cookie of each of the temporary webpage windows is also independent of each other, whereby achieving the multi-account login for the same user. It can be seen that, by means of this application, the information of several different accounts may not bring the confusion and mutual influence, thereby solving the problem that the existing browser is unable to perform multi-account login using Cookie, and it is convenient for the multi-account user to use the browser, thereby improving the use experience of the user.

The above description is merely an overview of the technical solution of the present invention. In order to more clearly understand the technical solution of the present invention, it can be implemented according to the contents of the description, and to make the foregoing and other objects, features and advantages of the invention more apparent, detailed embodiments of the invention will be provided below.

BRIEF DESCRIPTION OF DRAWINGS

Various other advantages and benefits will be more clearly understood by reading the following detailed description of the embodiments by a person skilled in the art. The accompanying drawings are provided only for the purpose of illustrating the embodiments but not intended to limit the present invention. Throughout the accompanying drawings, the same reference signs may refer to the same parts. In the drawings.

DETAILED DESCRIPTION OF EMBODIMENTS

The present invention will be further described with reference to the accompanying drawings and the specific embodiments hereinafter.

First Embodiment

Figure 1:
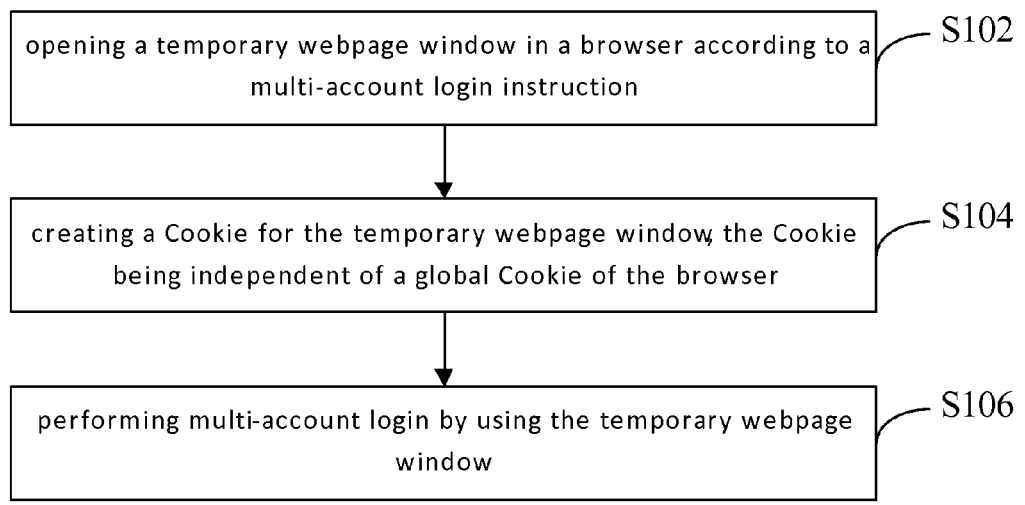
FIG. 1 is a flowchart of a multi-account login method according to a first embodiment of the present application.

Referring to FIG. 1, it shows a flowchart of a multi-account login method according to a first embodiment of the present application.

The multi-account login method according to this embodiment includes the following steps:

S102: opening a temporary webpage window in a browser according to a multi-account login instruction.

The temporary webpage window refers to a webpage window which does not record a user's browsing history and has an independent Cookie.

Preferably, the temporary webpage window may use a tab (for example, the title bar of the page window displays "temporary", etc.) to be distinguished with a conventional webpage window.

Step S104: creating a Cookie for the temporary webpage window, wherein the Cookie is independent of a global Cookie of the browser.

Typically, only 1 copy of Cookie (namely, the global Cookie of the browser), 1 copy of temporary file may be saved in the browser for the same webpage (website), and 1 piece of browsing history record is generated for each visit. In this embodiment, the system creates an independent Cookie for the temporary webpage window which is independent of an existing global Cookie, so as to avoid the mutual interference of the information of multiple accounts. The independent Cookie may be set in any suitable form. For example, a separate memory space may be set in a system memory for the use of the independent Cookie, or a separate area may be set in other suitable area (such as, a hard disk) for the use of the Cookie, etc.

Step S106: performing multi-account login by using the temporary webpage window.

In this embodiment, the multi-account login may be performed by combining the temporary webpage window and the conventional webpage window, or the multi-account login may be performed only in a form of the temporary webpage window. In the case that the multi-account login is performed only in a form of the temporary webpage windows, since each of the temporary webpage windows has a respective independent Cookie, the information of a plurality of accounts for a user will not be influenced and interfered with each other.

In this embodiment, the temporary webpage window with independent Cookie may be used to realize the multi-account login for the multi-account user simultaneously having multiple accounts. The form and content of the temporary webpage window may be the same as those of conventional webpage window, except that the Cookie of the temporary webpage window is independent of the global Cookie of the browser. The multi-account user may realize the multi-account login of multiple accounts according to the Cookie of the temporary webpage window and the global Cookie of the browser. Further, if a number of temporary webpage windows are used to perform the multi-account login, the Cookie of each of the temporary webpage windows is also independent of each other, whereby achieving the multi-account login for the same user. It can be seen that, by means of this application, the information of several different accounts may not bring the confusion and mutual influence, thereby solving the problem that the existing browser is unable to perform multi-account login using Cookie, and it is convenient for the multi-account user to use the browser, thereby improving the use experience of the user.

Second Embodiment

Figure 2:
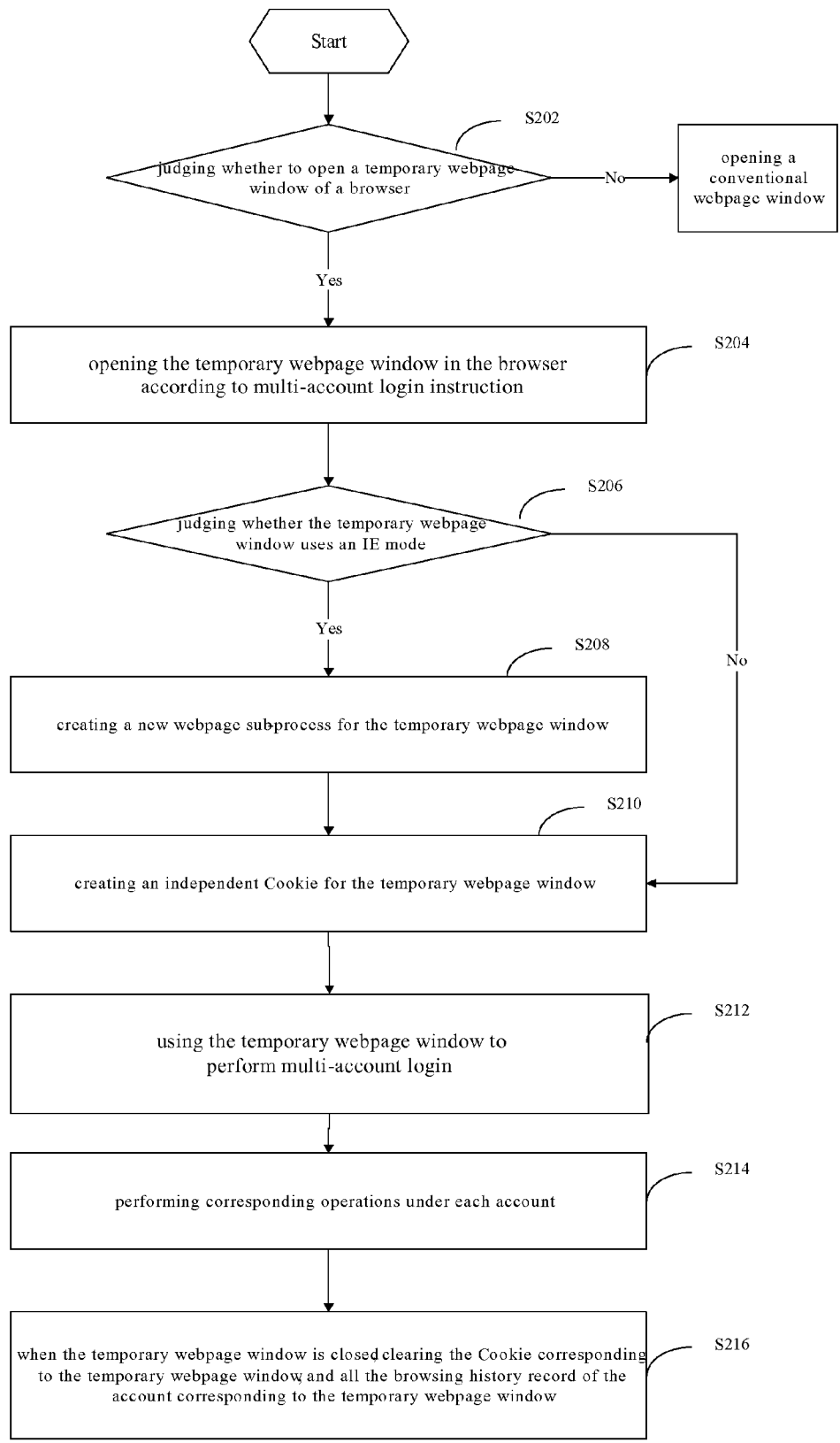
FIG. 2 is a flowchart of a multi-account login method according to a second embodiment of the present application.

Referring to FIG. 2, it shows a flowchart of a multi-account login method according to a second embodiment of the present application.

The multi-account login method according to this embodiment may include the following steps:

Step S202: judging whether to open a temporary webpage window of a browser, if so, performing step S204; and if not, opening a conventional webpage window.

Optionally, when judging whether to open the temporary webpage window of the browser, it is possible to judge whether to open the temporary webpage window according to a URL (Uniform Resource Locator), webpage contents, website opening source and a temporary webpage window opening instruction input by a user. By this way, it may be able to accurately determine whether to open the temporary webpage window, improve system efficiency and avoid unnecessary window display, thereby improving the use experience of the user.

Optionally, the browser according to this embodiment may support multiple browsing modes, such as a browsing mode in which an IE core renders a webpage, a browsing mode in which a Webkit core renders a webpage, a browsing mode in which a Gecko core renders a webpage and a browsing mode in which a Presto core renders a webpage. Of course, the application is not limited thereto, but any other suitable browsing mode may be used to achieve the multi-account login method according to this embodiment.

Optionally, the multiple browsing modes may include a dual-core browsing mode. The dual-core browsing mode may include: a first mode (such as an IE mode) and a second mode (such as a speed mode), etc. The browsing mode is a mode used when the browser displays a webpage. In this embodiment, in the first mode the webpage is rendered by the IE core, and in the second mode the webpage is rendered by the Webkit core. In the speed mode, the website is opened faster; in the IE mode, the website is opened slightly lower than that in the speed mode, but the webpage has less compatibility problems, and the website may be rendered by using an IE rendering manner.

By means of the multiple browsing modes, a plurality of choices of using a browser may be provided to the user, thereby further improving the use experience of the user in using the browser.

Optionally, when the browser switches the modes, the webpage sub-process of the temporary webpage window in the current mode may be destroyed, and a webpage sub-process and an independent Cookie in a newly switched mode are created for the temporary webpage window.

The IE (Internet Explorer) mode and the speed mode are taken as examples.

In one mode switching, assuming that the temporary webpage window is currently in the IE mode and will be switched from the IE mode to the speed mode, processing flow of the temporary webpage window may be as follows, including: Step (1): when the browser is switched from the IE mode to the speed mode, the system may destroy the webpage sub-process of the temporary webpage window in the current IE mode; Step (2): the system creates a webpage sub-process and an independent Cookie in the speed mode for the temporary webpage window; Step (3): the temporary webpage window uses the independent Cookie in the newly created speed mode to perform account login and access.

In another mode switching, assuming that the temporary webpage window is currently in the speed mode and will be switched from the speed mode to the IE mode, processing flow of the temporary webpage window may be as follows, including: Step (11): when the browser is switched from the speed mode to the IE mode, the system may destroy the webpage sub-process of the temporary webpage window in the speed mode; Step (12): the system creates a webpage sub-process and an independent Cookie in the IE mode for the temporary webpage window; Step (13): the temporary webpage window uses the independent Cookie in the newly created IE mode to perform account login and access.

It should be appreciated that, although only the IE mode and the speed mode are taken as examples in this embodiment, the person skilled in the art will understand that the switching of any other browsing modes can be carried out with reference to this embodiment.

Step S204: According to multi-account login instruction, opening the temporary webpage window in the browser.

In this step, one or more temporary webpage window may be opened. The opened temporary webpage window may be a webpage window having the same contents as an opened account login window, or a webpage window completely different from an opened conventional webpage window.

Step S206: judging whether the temporary webpage window uses the IE mode, if so, performing step S208; and if not, performing step S210.

When a number of temporary webpage windows are opened, each of the temporary webpage windows is needed to be judged. For the convenience of description, one temporary webpage window will be taken as an example in the embodiment.

Step S208: creating a new webpage sub-process for the temporary webpage window, and performing step S210.

In the IE mode, a new webpage sub-process may be created for the temporary webpage window for the purpose of isolating the Cookie of the temporary webpage window. A multi-process management of a browser may be achieved by creating the new webpage sub-process for the temporary webpage window. The temporary webpage window may have an independent operation process, thereby improving the stability and security in the operation of the temporary webpage window. Step S210: creating an independent Cookie for the temporary webpage window.

That is, a Cookie independent of the global Cookie of the browser is created for the temporary webpage window. When a number of temporary webpage windows are opened, each of the temporary webpage windows may have an independent Cookie.

Step S212: using the temporary webpage window to perform multi-account login.

During the multi-account login, a conventional webpage window and the temporary webpage window may be combined to perform the multi-account login, or only the temporary webpage window may be used to perform the multi-account login.

Step S214: performing corresponding operation under each account.

This step is a conventional operation after a successful account login. After a successful multi-account login, corresponding functions may be carried out to perform necessary task operations according to the user's requirement.

Step S216: when the temporary webpage window is closed, clearing the Cookie corresponding to the temporary webpage window, and all the browsing history record of the account corresponding to the temporary webpage window.

When closing the temporary webpage window after the completion of the corresponding operations, the system clears the Cookie corresponding to the temporary webpage window, and all the browsing history record of the account corresponding to the temporary webpage window, so that the web browsing process of the account cannot be traced, thereby achieving an incognito browsing function of the account.

By the incognito browsing function, the leakage of the user's information, especially sensitive information, may be avoided, thereby improving the security for the user to use the network.

By means of this embodiment, not only a multi-login function of additional accounts (that is, the browser is required to login multiple accounts for one website, such as the multi-login of QQ space) but also an incognito browsing function (that is, the browser is required not to save the Cookie, temporary files and not to generate browsing history record) may be realized. The problem that an existing browser is unable to perform multi-account login using Cookie may be solved, thereby facilitating the multi-account user to use the browser; on the other hand, the security of the user in using browser may be ensured, thereby further improving the use experience of the multi-account user in using the browser.

Third Embodiment

Figure 3:
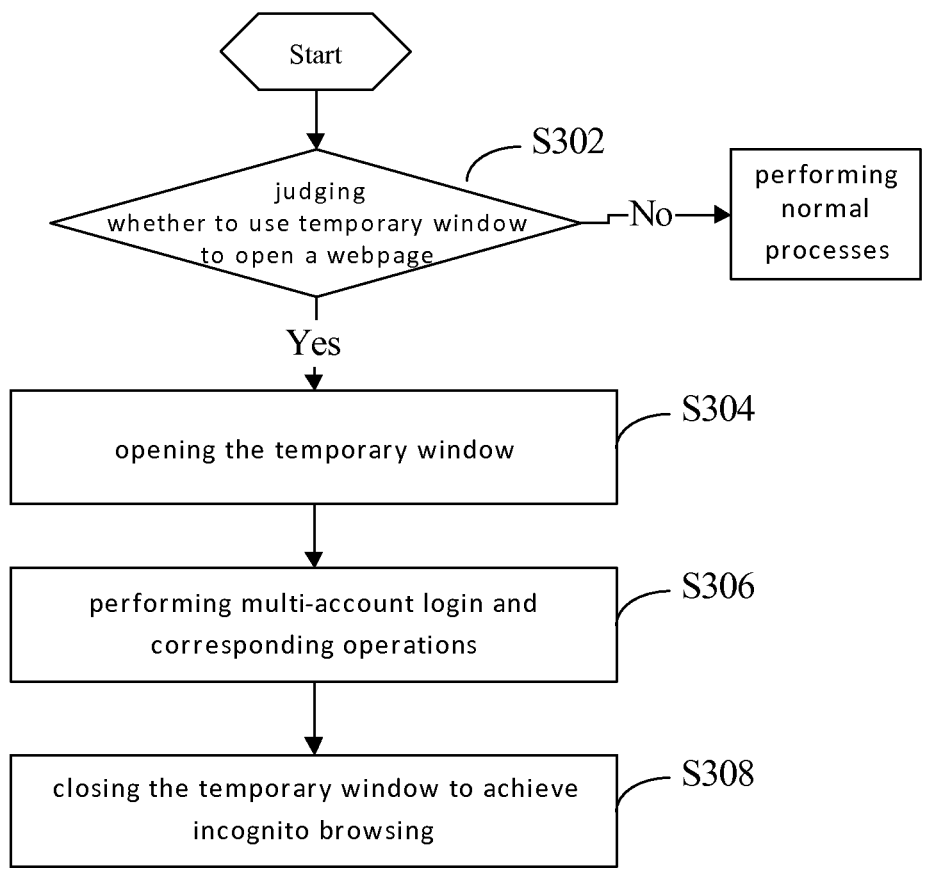
FIG. 3 is a flowchart of a multi-account login method according to a third embodiment of the present application.

Referring to FIG. 3, it shows a flowchart of a multi-account login method according to a third embodiment of the present application.

In this embodiment, a 360 speed browser will be taken as an example. The 360 speed browser may be realized to support two browsing modes by supporting two types of cores (Webkit and IE), in which the webpage rendered by using the Webkit core is referred to as a speed mode and the webpage rendered by using the IE core is referred to as an IE mode. In this embodiment, the 360 browser supports the multi-login function of additional accounts (i.e., multi-account login) and the incognito browsing function (i.e., the browser does not save the Cookie and temporary files and does not generate browsing history record). In implementation, the browser may provide a temporary window (i.e., the temporary webpage window) function, such that a temporary window may be automatically opened according to user's needs, or the browser may automatically use a temporary window to open a webpage, thereby meeting the user's requirements of the multi-login additional accounts and the incognito browsing.

In this embodiment, the multi-account login method will be described, with reference to the example in which multiple accounts (for example, a plurality of QQ numbers) of one account system are simultaneously login in the 360 browser. However, it should be understood by the person skilled in the art that any other browsers which need to support the multi-login function of additional accounts and the incognito browsing function may be realized with reference to this embodiment. The application will not be limited thereto.

The multi-account login method according to the embodiment may comprise the following steps:

Step S302: judging whether to use a temporary window to open a webpage, if so, performing step S304; and if not, performing normal processes.

In this step, when the user needs the multi-login function of additional accounts and/or the incognito browsing function, the temporary window (i.e., the temporary webpage window, which is called as temporary window in this embodiment in short) may be used to open a corresponding webpage.

Herein, a typical way of judging whether the multi-login of additional accounts or the incognito browsing is needed may include: analyzing a URL (such as specific information contained in the URL), analyzing webpage contents (such as given field or specific information contained in the webpage contents), and analyzing one or more of website opening sources. As an alternative, it is possible to directly determine the need of the multi-login of additional accounts or the incognito browsing and the need to open the temporary webpage window, according to a temporary webpage window opening instruction input by a user.

Optionally, when analyzing the URL, the webpage contents and the website opening sources, it is possible to use a preset rule to analyze. If the content that matches with the given rule is present, it is considered that the multi-login function of additional accounts or the incognito browsing function is needed; otherwise, it is considered that the multi-login function of additional accounts or the incognito browsing function is not needed. The given rule may comprise: one or more of the given field contained in the URL, the given field contained in the webpage contents and the given field in the website opening sources. For example, according to the value of "UID" (User identifier) field in the URL, it is possible to determine whether there is a need to use the multi-login function of additional accounts or the incognito browsing function and open the temporary webpage window. Similarly, similar preset rules can be applied to the analysis of the webpage contents and the website opening sources. For the preset rule of webpage contents, it is possible to analyze whether the webpage contents contain preset text contents (such as, "User Name" and/or "User Password" and so on). Of course, the application shall not be limited thereto, and the person skilled in the art can set appropriate rules arbitrarily based on actual conditions.

For example, in the analysis of the website opening source, when the opening source, such as the URL passed to the browser, is obtained, a preset rule may be used to analyze the URL. Herein, the rule may be preset and stored in a corresponding location (for example, stored in a local database or a server side database). In the analysis of the URL, the given rule may be obtained from the corresponding storage location so as to perform the analysis. For example, when the user click on a link from a third-party software interface (such as QQ) to open the browser, the field of a URL (such as "client uin" field) may be analyzed according to the URL transmitted to the browser, and it may be inquired in the database whether to open this webpage in a temporary window according to the field, in such a manner it is possible to automatically satisfy the requirement of the multi-login of additional accounts and the incognito browsing. For example, by analyzing the value of "client uin" field in the URL, assuming that the value of the field is "12345", it can be concluded that the current user is a user having QQ number "12345", and the user is accessing QQ space. At this time, the system may determine there is a need for the user having QQ number "12345" to open the temporary webpage window.

It should be noted that the above database may be maintained, and can be set on the local side or on the server side.

Figure 4:
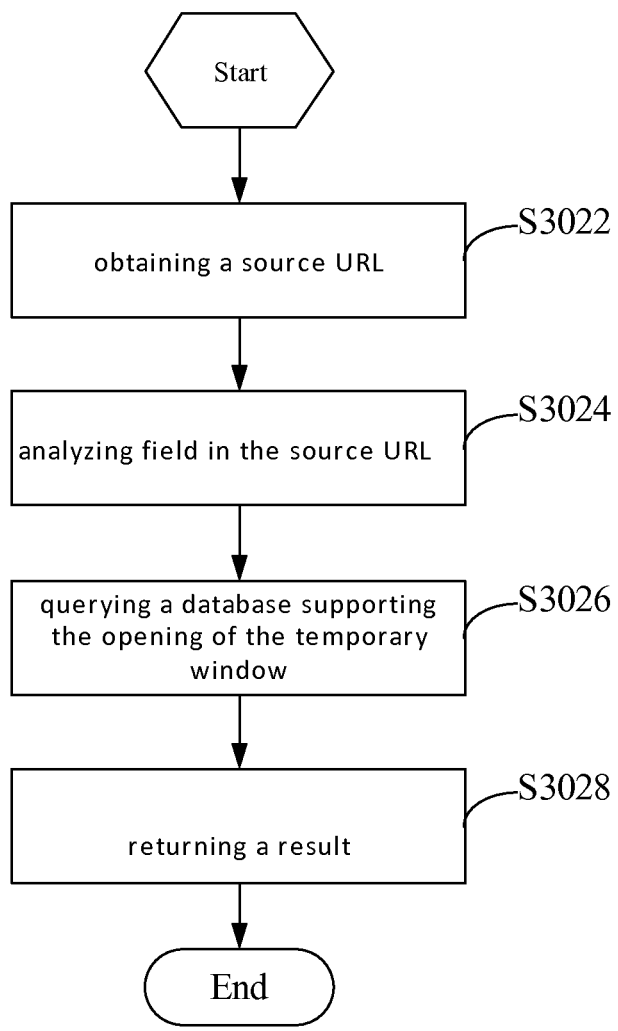
FIG. 4 is a flowchart of step of judging whether to open a temporary webpage window in the embodiment as shown in FIG. 3.

A process of judging whether to open a temporary window according to opening source is shown in FIG. 4, including:

Step S3022: obtaining a source URL;

Step S3024: analyzing the field of the source URL;

Step S3026: querying a database supporting the open of the temporary window; and Step S3028: returning a query result.

When the user needs the multi-login function of additional accounts and the incognito browsing function, the browser will use the temporary window to open the webpage. For example, by clicking on "New Temporary Window" menu or opening a link such as QQ space or Sina micro blog by the user, the 360 speed browser will automatically determine to open the temporary window. If there is no need to use the temporary window to open, then proceed to conventional processes.

Step S304: opening the temporary window.

The temporary windows may be opened in the speed mode or the IE mode and can be switched. If it is opened in the IE mode, in order to isolate the Cookies of different temporary windows, it may be required to create a new sub-process of the IE mode and then the main process of the browser may create an independent Cookie for the temporary window; if it is opened in the speed mode, the main process of the browser may directly create an independent Cookie for the temporary window and the independent Cookie may be only stored in a memory, so as to facilitate the management and operation, improve the system efficiency and save system storage space. Accordingly, there is also a global Cookie that is used by the webpage request of non-temporary window. A network request may be initiated when opening a webpage. The webpage request of the temporary window may use the independent Cookie, thus it is possible to distinguish login requests of different temporary windows and login different accounts, so as to achieve a purpose of simultaneous login of multiple accounts. The webpage of non-temporary window uses the global Cookie.

Figure 5:
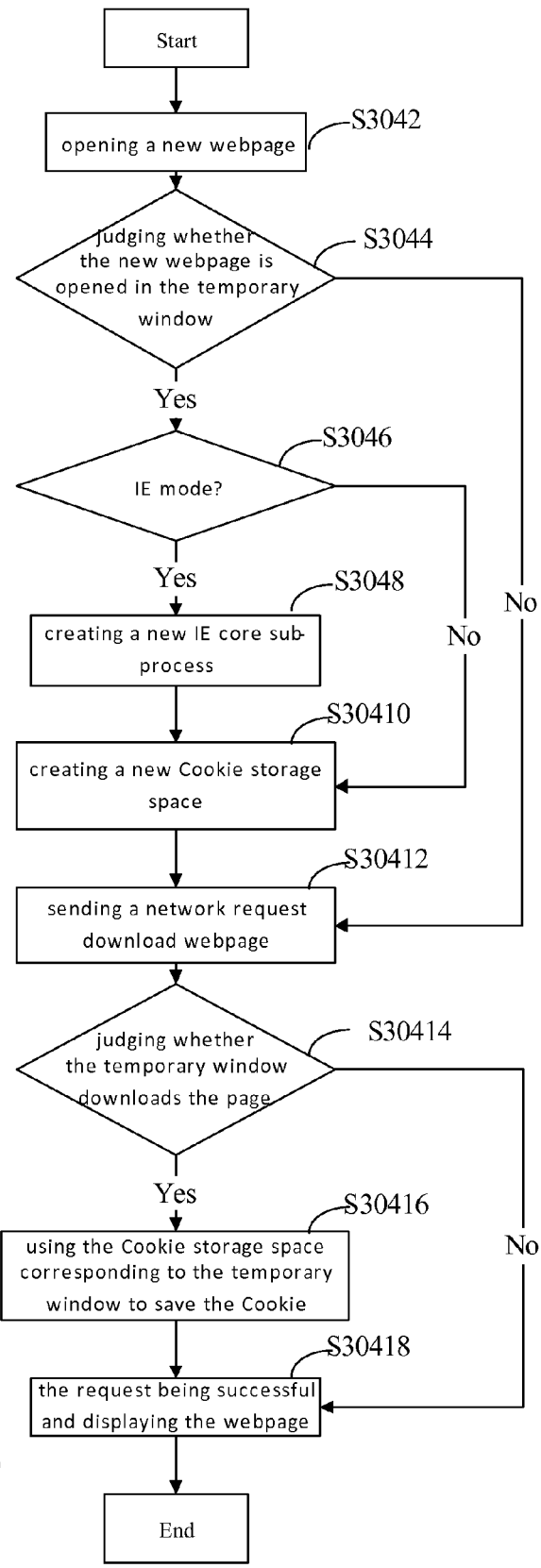
FIG. 5 is a flowchart of step of opening the temporary webpage window in the embodiment as shown in FIG. 3.

In the present embodiment, the step of opening a temporary (webpage) window is shown in FIG. 5, including:

Step S3042: opening a new page;

Step S3044: judging whether the new page is opened in the temporary window, if yes, performing step S3046; and if not, performing step S30412;

Step S3046: judging whether the temporary window uses the IE mode, if so, performing step S3048; and if not, performing step S30410;

Step S3048: creating a new IE core sub-process;

Step S30410: creating a new memory Cookie storage space; Step S30412: sending a network request download page;

Step S30414: judging whether the temporary window downloads the page, if so, performing step S30416; and if not, performing step S30418;

Step S30416: using the Cookie storage space corresponding to the temporary window to save the Cookie;

Step S30418: the request being successful and displaying the webpage.

Step S306: performing multi-account login and corresponding operations.

Step S308: closing the temporary window to achieve incognito browsing.

After the corresponding operations are completed by using the temporary window, the temporary window is closed. When closing the temporary window, for example when the user clicks to close the temporary window to destroy the interface of the temporary window, the system clears memory Cookie used by the temporary window and no longer use it again, and clears the user's browsing history, thereby enabling the user's incognito browsing.

Figure 6:
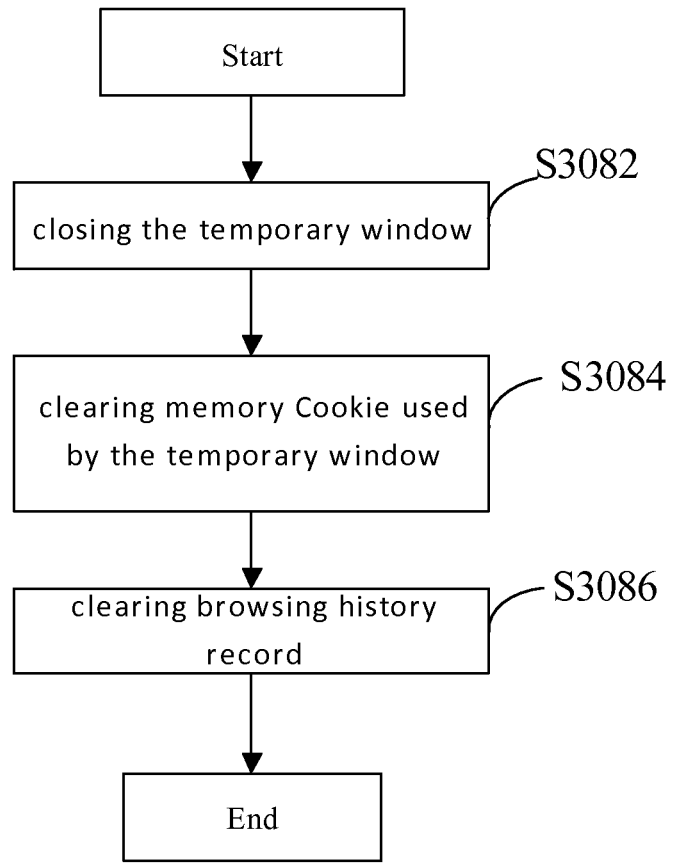
FIG. 6 is a flowchart of step of closing the temporary webpage window in the embodiment as shown in FIG. 3.

In the present embodiment, the process of closing the temporary window is shown in FIG. 6, including:

Step S3082: closing the temporary window;

Step S3084: clearing the memory Cookie used by the temporary window;

Step S3086: clearing the browsing history record.

By this embodiment, both the multi-login function of additional accounts and the incognito browsing function may be achieved. For example, in Webkit and IE cores of a dual-core browser, the multi-login function of additional accounts may be fully achieved, and due to the employment of the independent Cookie, the cores can be freely switched in use in such a manner that the Cookie is not crossed and lost. The requirements of the multi-login of additional accounts and the incognito browsing can be enabled in one product concept. It is possible to intelligently judge requirements of the multi-login of additional accounts or the incognito browsing in the user's scenarios, so as to automatically (or with prompt to the user) access the corresponding websites in the temporary window.

It should be noted that, in this embodiment, different accounts are distinguished by different windows, Cookies are independent between different windows, the multi-login of different accounts is possible and the multi-login of additional accounts cannot be achieved in one window. However, it should be appreciated by the person skilled in the art that, above restriction is only for the purpose of the avoidance of user's confusion, if the user's confusion is avoided, the multi-login of additional accounts may be also achieved in one window.

Fourth Embodiment

Figure 7:
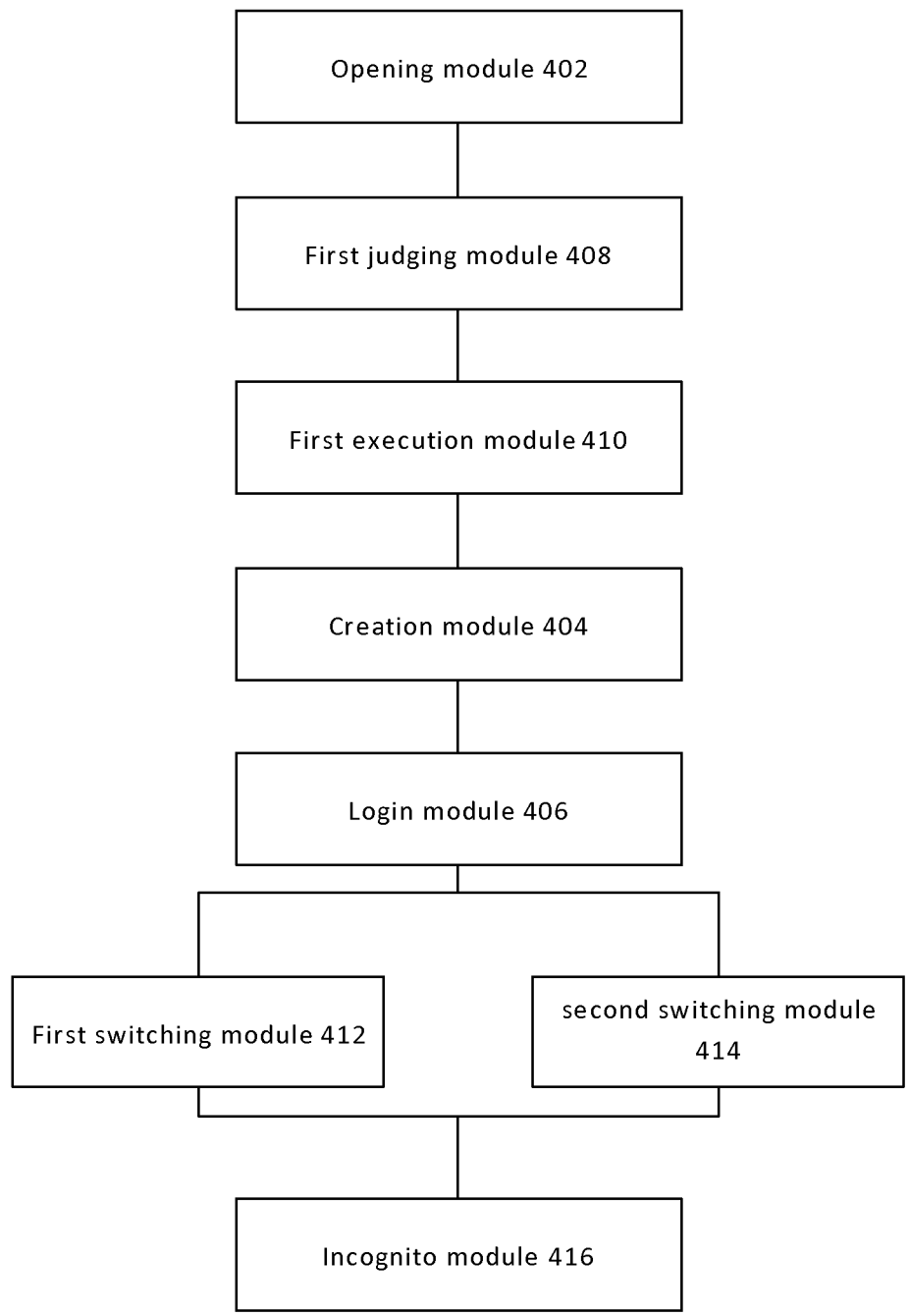
FIG. 7 is a block diagram of a multi-account login apparatus according to a fourth embodiment of the present application.

Referring to FIG. 7, it shows a block diagram of a multi-account login apparatus according to a fourth embodiment of the present application.

The multi-account login apparatus according to the embodiment includes: an opening module 402, configured to open a temporary webpage window in a browser according to a multi-account login instruction; a creation module 404, configured to create a Cookie for the temporary webpage window, wherein the Cookie is independent of the global Cookie of the browser; and a login module 406, configured to perform multi-account login by using the temporary webpage window.

Optionally, the browser supports multiple browsing modes.

Optionally, the multiple browsing modes include a dual-core browsing mode.

Optionally, the dual-core browsing mode includes a first mode (such as an IE mode) and a second mode (such as a speed mode), wherein in the first mode the webpage is rendered by the IE core, and in the second mode the webpage is rendered by the Webkit core.

Optionally, the multi-account login apparatus according to the embodiment also comprises: a first judging module 408, configured to judge whether the temporary webpage window uses the first mode before the creation module 404 creates a Cookie for the temporary webpage window; and a first execution module 410, configured to create a new webpage sub-process for the temporary webpage window if the determination result of the first judging module 408 is Yes, and to operate the creation module 404 to directly create a Cookie for the temporary webpage window if the determination result of the first judging module 408 is No.

Optionally, the multi-account login apparatus according to the embodiment also comprises: a first switching module 412, configured to destroy the webpage sub-process of the temporary webpage window in the first mode when the browser is switched from the first mode to the second mode, and to create a webpage sub-process and an independent Cookie in the second mode for the temporary webpage window; and/or a second switching module 414, configured to destroy the webpage sub-process of the temporary webpage window in the second mode when the browser is switched from the second mode to the first mode, and to create a webpage sub-process and an independent Cookie in the first mode for the temporary webpage window.

Optionally, the opening module 402 is configured to determine to open the temporary webpage window in the browser by a given rule according to at least one of a URL, webpage contents, a website opening source and a temporary webpage window opening instruction input by the user.

Optionally, the given rule comprises: one or more of a given field in the URL, a given field in the webpage contents and a given field in the website opening source.

Optionally, each of the given field in the URL, the given field in the webpage contents and the given field in the website opening source is a user identifier (UID) field.

Optionally, the given rule is stored in a local database or in a server-side database.

Optionally, the multi-account login apparatus according to the embodiment also comprises: an incognito module 416, configured to, after the login module 406 uses the temporary webpage window to perform multi-account login and when the temporary webpage window is closed, clear the Cookie corresponding to the temporary webpage window and all the browsing history of the accounts corresponding to the temporary webpage window.

Optionally, the Cookie created for the temporary webpage window is only stored in a memory.

Optionally, the multi-account login apparatus according to this embodiment is installed in the browser.

The multi-account login apparatus according to this embodiment is used to implement a corresponding multi-account login method in a plurality of method embodiments as described above, and has the same advantageous effects as the corresponding method embodiments. Thus the description thereof will be omitted.

Fifth Embodiment

Figure 8:
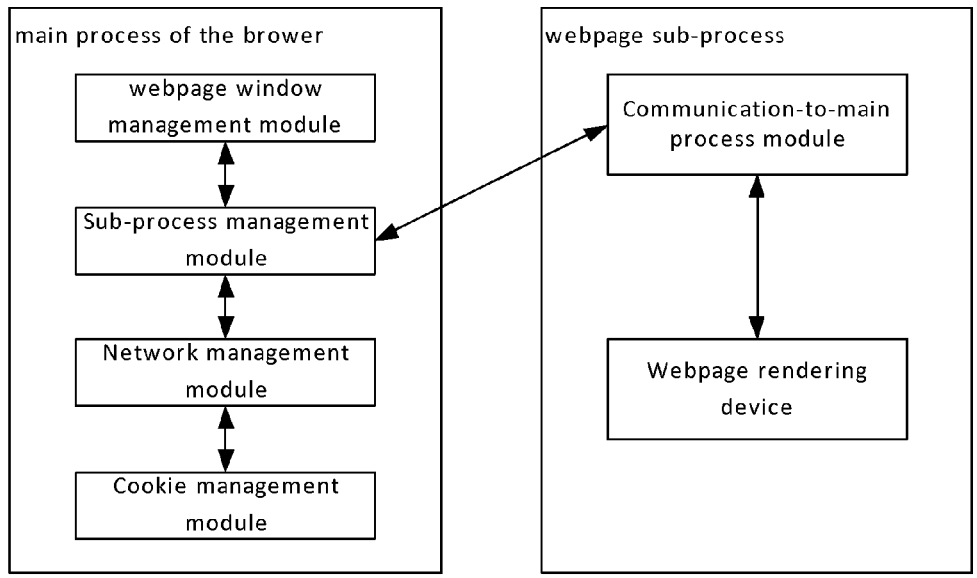
FIG. 8 is a schematic block diagram of a multi-account login apparatus according to a fifth embodiment of the present application.

Referring to FIG. 8, it shows a schematic block diagram of a multi-account login apparatus according to a fifth embodiment of the present application.

In this embodiment, the multi-account login apparatus is logically divided from the view of browser main process and webpage sub-process.

Herein, a browser main process module is configured to manage the main interface of the browser and be responsible for managing the sub-process. It comprises: a webpage window management module, a sub-process management module, a network management module and a Cookie management module. Herein, the webpage window management module is configured to manage the creation, display and destruction of the webpage window and manage a focus, etc. (including functions of the opening module, the second judging module, the second execution module and a part of the incognito module in the fourth embodiment); the sub-process management module is configured to manage the creation and destruction of a sub-process and perform mutual communication between sub-processes (including functions of the first judging module and the first execution module in the fourth embodiment); the network management module is configured to manage all network requests, including communications of various protocols such as http (including the function of the login module in the fourth embodiment); the Cookie management module is configured to manage the storage and use of the Cookie (including functions of the creation module and a part of the incognito module in the fourth embodiment).

The webpage sub-process module is configured to render a webpage, including: a communication-to-main process module and a webpage rendering device. Herein, the communication-to-main process module is configured to receive information from the main process and send information to the main process; the webpage rendering device is configured to parse html contents to display multimedia information such as text, picture, and video in the webpage.

When the multi-account login apparatus according to this embodiment is used to open a temporary window (temporary webpage window), the main process of the browser may notify the webpage window management module to create a new window, and the sub-process management module may create a new webpage sub-process as required; after the sub-process is successfully created, the main process of the browser may first notify the Cookie management module to create an independent Cookie, and then notify the network management module to initiate a network request; the network management module may determine the Cookie memory space to be used according to whether it is a temporary window, and after the network request is successful, may notify the sub-process and then notify the page rendering device of the sub-process to display the webpage.

Figure 9:
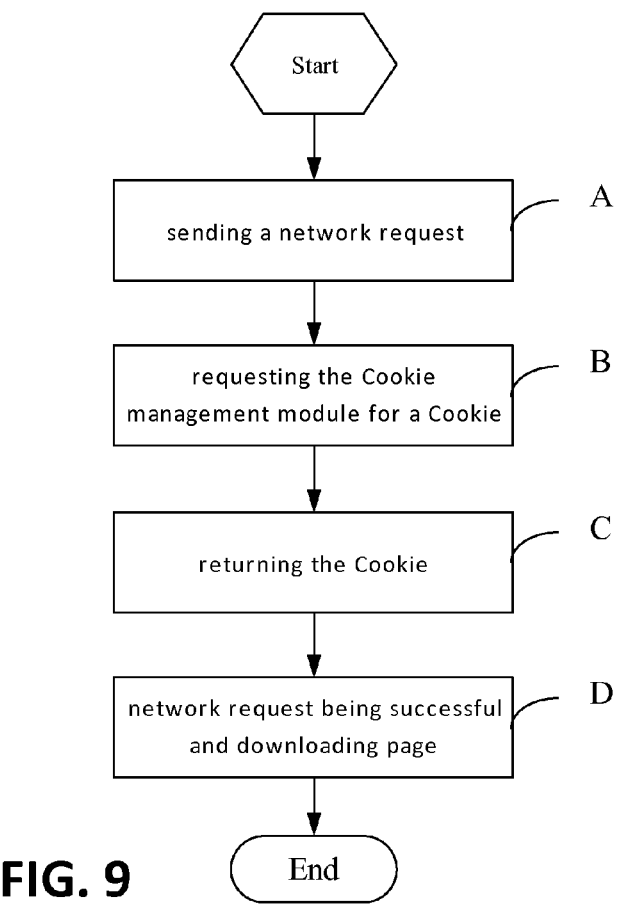
FIG. 9 is a flowchart of the use of a Cookie in a speed mode and an IE mode when performing the multi-account login by using the apparatus as shown in FIG. 8.

The browser in this embodiment supports multiple browsing modes, including an IE mode and a speed mode. A Cookie using flow in the IE mode and the speed mode is shown in FIG. 9, including: Step A: sending a network request via the network management module in the speed mode or the IE mode; Step B: requesting the Cookie management module for a Cookie; Step C: returning the Cookie by the Cookie management module; Step D: the network request being successful and downloading the page.

In the case that the browser supports multiple browsing modes, browsing mode switching might occur during the use of the browser. When the browser performs the browsing mode switching, as shown in FIG. 8, both the network management module and the Cookie management module are in the main process. When the IE mode is switched to the speed mode, the network management module may create a webpage sub-process of the speed mode and destroy the webpage sub-process of the IE mode, and the Cookie management module may create an independent Cookie in the speed mode for the temporary window; similarly, when the speed mode is switched to the IE mode, it may create a webpage sub-process of the IE mode and destroy the webpage sub-process of the speed mode, and the Cookie management module may create an independent Cookie in the IE mode for the temporary window. It can be seen that, during the switching of dual-core, there is no influence on the network request of the main process and the Cookie, so as to ensure that the Cookies are not crossed and lost.

By means of the multi-account login solution according to the application, the browser may have both the multi-login function of additional accounts and the incognito browsing function, and may be convenient for use. This can avoid the problems that there is a large learning cost for the user and the user has to definitely understand his or her demands to choose corresponding functions for use according to his or her demands, due to too many new concepts. In addition, the solution according to the application may achieve both the multi-login function of additional accounts and the incognito browsing function, so the problems in the existing solution that the user cannot be satisfied simultaneously with the multi-login of additional accounts and the incognito browsing can be addressed. For example, at a certain sensitive website, the user may login accounts A and B simultaneously, without saving any browsing record of this sensitive site. In conclusion, the solution according to the application may improve the use experience, and may provide the user with a most complete function at the lowest learning cost; may enable both the multi-login function of additional accounts and the incognito browsing function; may automatically determine whether to use the multi-login function of additional accounts and the incognito browsing function according to the user's situation; and may incorporate the multi-login function of additional accounts and the incognito browsing function into an existing browser function, without resulting in defects of existing functions by adding new functions.

The various embodiments in the description have been explained stepwise. Each of the embodiments has only emphasized the differences from others, and the same or similar explanations between embodiments could be made reference to each other. Since the device embodiments are substantially similar to the method embodiments, the descriptions thereof are relatively brief. As for the related parts, reference may be made to the corresponding description of the method embodiments.

Each of components according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the members of the browser device according to the embodiments of the present invention. The present invention may also be implemented as equipments or device programs (for example, computer programs and computer program products) for executing some or all of the methods as described herein. The programs for implementing the present invention may be stored in the computer readable medium, or have a form of one or more signals. Such signals may be downloaded from an internet website, or be provided in a carrier, or be provided in other manners.

Figure 10:
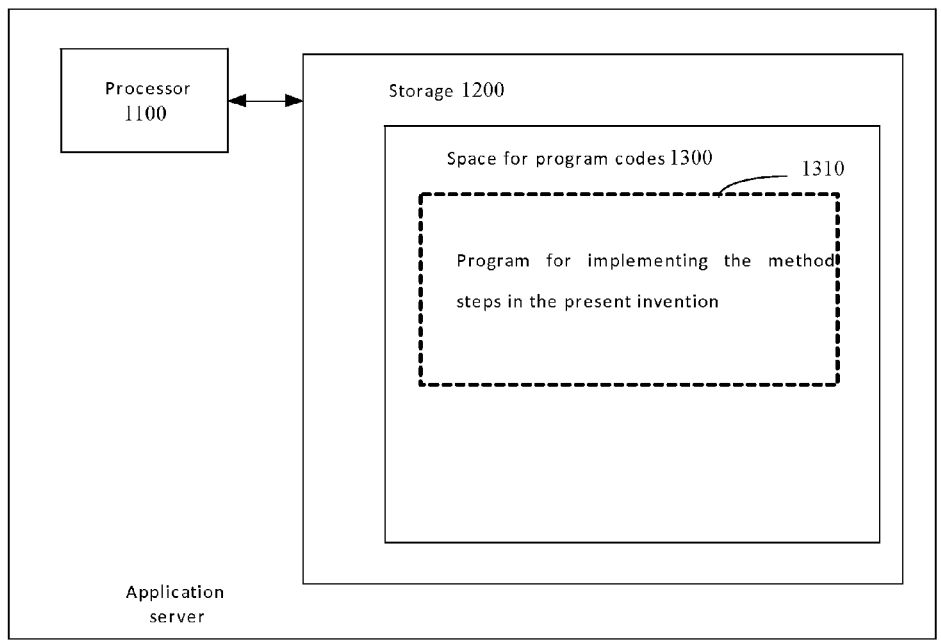
FIG. 10 schematically shows a block diagram of a server for executing the method according to the present invention.
Figure 11:
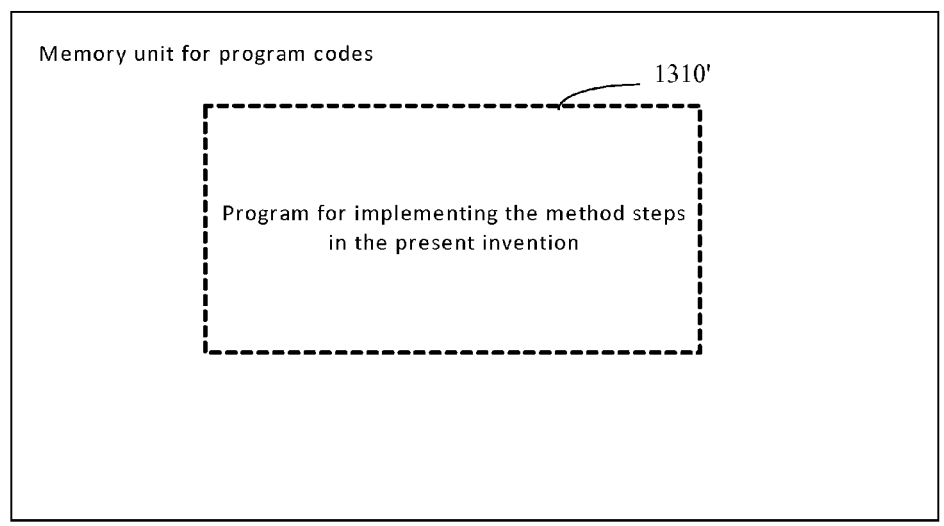
FIG. 11 schematically shows a storage unit for holding or carrying program codes to execute the method according to the present invention.

For example, FIG. 10 schematically shows a server which can implement the multi-account login method for a browser according to the present invention, such as an application server. Traditionally, the server comprises a processor 1100 and a computer program product or a computer readable medium in form of storage 1200. The storage 1200 may be electronic storages such as a flash, an EEPROM (Electrically Erasable Programmable Read-Only Memory), an EPROM, a hard disk or a ROM. The storage 1200 has a memory space 1300 for program codes 1310 for executing any steps of the above methods. For example, the memory space 1300 for the program codes may comprise respective program codes 1310 for implementing the various steps in the above mentioned method. These program codes may be read from and/or be written into one or more computer program products. These computer program products comprise program code carriers such as a hard disk, a compact disk (CD), a memory card or a floppy disk. These computer program products are usually the portable or stable memory units as shown in reference FIG. 11. The memory units may be provided with memory sections, memory spaces, etc. similar to the storage 1200 of the server as shown in FIG. 10. The program codes may be compressed in an appropriate form. Usually, the memory unit includes computer readable codes 1310' which can be read by processors such as 1100. When these codes are operated on the server, the server may execute each step as described in the above method.

The terms "one embodiment", "an embodiment" or "one or more embodiment" used herein means that, the particular feature, structure, or characteristic described in connection with the embodiments may be included in at least one embodiment of the present invention. In addition, it should be noticed that, for example, the wording "in one embodiment" used herein is not necessarily always referring to the same embodiment.

A number of specific details have been described in the specification provided herein. However, it should be understood that the embodiments of present invention may be practiced without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of claims as appended. In the claims, any reference signs between brackets should not form a limit of the claims. The wording "comprising" does not exclude the presence of elements or steps not listed in a claim. The wording "a" or "an" in front of element does not exclude the presence of a plurality of such elements. The present invention may be achieved by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

It should also be noticed that the language used in the present specification is chosen for the purpose of readability and teaching, rather than selected in order to explain or define the subject matter of the present invention. Therefore, it is obvious for an ordinary skilled person in the art that modifications and variations could be made without departing from the scope and spirit of the claims as appended. For the scope of the present invention, the disclosure of present invention is illustrative but not restrictive, and the scope of the present invention is defined by the appended claims.

The invention claimed is:

1. A multi-account login method, comprising:
   determining, by a computing device, whether there is a need of using a first type of window of a webpage to open the webpage in a browser based on a predetermined rule, wherein the first type of window of the webpage uses an independent cookie in the browser that is independent of a global cookie used by a second type of window of the webpage, wherein the independent cookie includes information associated with a first account of the webpage for a user, and wherein the global cookie includes information associated with a second account of the webpage for the user;
   automatically opening, by the computing device, the first type of window of the webpage in the browser based at least in part on a determination of using the first type of window to open the webpage;
   creating the independent cookie for the first type of window of the webpage; and
   performing multi-account login by using the first type of window of the webpage.

2. The method according to claim 1, wherein, the browser supports multiple browsing modes.

3. The method according to claim 2, wherein, the multiple browsing modes include a dual-core browsing mode.

4. The method according to claim 3, wherein, the dual-core browsing mode includes a first mode and a second mode, wherein in the first mode the webpage is rendered by an IE core and in the second mode the webpage is rendered by a Webkit core.

5. The method according to claim 4, wherein, before the creating the independent Cookie for the first type of window of the webpage, further comprises:
   determining whether the first type of window of the webpage uses the first mode;
   creating a webpage sub-process for the first type of window of the webpage in response a determination that the first type of window of the webpage uses the first mode; and
   creating the independent Cookie for the first type of window of the webpage in response to a determination that the first type of window of the webpage does not use the first mode.

6. The method according to claim 5, wherein, the method further comprises:
   destroying the webpage sub-process of the first type of window of the webpage in the first mode when the browser is switched from the first mode to the second mode.

7. The method according to claim 3, wherein, the method further comprises:
   destroying a webpage sub-process of the first type of window in a second mode when the browser is switched from the second mode to a first mode; and
   creating an independent Cookie and a webpage sub-process in the first mode for the first type of window of the webpage.

8. The method according to claim 1, wherein, the determining that there is a need of using a first type of window of a webpage to open the webpage based on a predetermined rule comprises:
   analyzing at least one of a Uniform Resource Locator, webpage contents, and website opening source.

9. The method according to claim 8, wherein, the predetermined rule comprises: one or more of a given field in the Uniform Resource Locator, a given field in the webpage contents, or a given field in the website opening source.

10. The method according to claim 1, wherein, after performing multi-account login by using the first type of window of the webpage, further comprises:
    when the first type of window of the webpage is closed, clearing the independent Cookie corresponding to the first type of window of the webpage and all browsing history of an account corresponding to the first type of window of the webpage.

11. A multi-account login apparatus, comprising:
    a processor; and
    a memory communicatively coupled to the processor and storing instructions that upon execution by the processor cause the processor to:
      determine whether there is a need of using a first type of window of a webpage to open the webpage in a browser based on a predetermined rule, wherein the first type of window of the webpage uses an independent cookie in the browser that is independent of a global cookie used by a second type of window of the webpage, wherein the independent cookie includes information associated with a first account of the webpage for a user, and wherein the global cookie includes information associated with a second account of the webpage for the user;
      automatically open window of a webpage in the browser based at least in part on a determination of using the first type of window to open the webpage;
      create the independent Cookie for the first type of window of the webpage; and
      perform multi-account login by using the first type of window of the webpage.

12. The apparatus according to claim 11, wherein, the browser supports multiple browsing modes.

13. The apparatus according to claim 12, wherein, the multiple browsing modes include a dual-core browsing mode.

14. The apparatus according to claim 13, wherein, the dual-core browsing mode includes a first mode and a second mode, wherein in the first mode the webpage is rendered by an IE core and in the second mode the webpage is rendered by a Webkit core.

15. The apparatus according to claim 14, wherein, the memory further storing instructions that upon execution by the processor cause the processor to:
    determine whether the first type of window of the webpage uses the first mode before creating the independent Cookie for the first type of window of the webpage; and
    create a webpage sub-process for the first type of window of the webpage in response to a determination that the first type of window of the webpage uses the first mode, and create the independent Cookie for the first type of window of the webpage in response to a determination that the first type of window of the webpage does not use the first mode.

16. The apparatus according to claim 14, wherein, the memory further storing instructions that upon execution by the processor cause the processor to:
    destroy the webpage sub-process of the first type of window of the webpage in the first mode when the browser is switched from the first mode to the second mode, and t-o create an independent Cookie in the second mode for the first type of window of the webpage.

17. The apparatus according to claim 14, wherein, the memory further storing instructions that upon execution by the processor cause the processor to:
    destroy a webpage sub-process of the first type of window of the webpage in the second mode when the browser is switched from the second mode to the first mode, and to create a webpage sub-process and an independent Cookie in the first mode for the first type of window of the webpage.

18. The apparatus according to claim 11, wherein, the memory further storing instructions that upon execution by the processor cause the processor to analyze at least one of a Uniform Resource Locator, webpage contents, and website opening source.

19. The apparatus according to claim 11, wherein, the memory further storing instructions that upon execution by the processor cause the processor to:
    after performing the multi-account login by using the first type of window of the webpage, when the first type of window of the webpage is closed, clear the independent Cookie corresponding to the first type of window of the webpage and all the browsing history of an account corresponding to the first type of window of the webpage.

20. A non-transitory computer readable medium bearing computer-readable instructions that upon execution on a computing device cause the computing device at least to:
    determine whether there is a need of using a first type of window of a webpage to open the webpage in a browser based on a predetermined rule, wherein the first type of window of the webpage uses an independent cookie in the browser that is independent of a global cookie used by a second type of window of the webpage, wherein the independent cookie includes information associated with a first account of the webpage for a user, and wherein the global cookie includes information associated with a second account of the webpage for the user;

automatically open the first type of window of the webpage in the browser based at least in part on a determination of using the first type of window to open the webpage;

create the independent Cookie for the first type of window of the webpage; and perform multi-account login by using the first type of window of the webpage.

\* \* \* \* \*